(No Model.)

H. HERDER.
SHEARS.

No. 479,090. Patented July 19, 1892.

WITNESSES:

INVENTOR
Herman Herder
BY
ATTORNEY

UNITED STATES PATENT OFFICE.

HERMAN HERDER, OF PHILADELPHIA, PENNSYLVANIA.

SHEARS.

SPECIFICATION forming part of Letters Patent No. 479,090, dated July 19, 1892.

Application filed April 30, 1892. Serial No. 431,332. (No model.)

*To all whom it may concern:*

Be it known that I, HERMAN HERDER, a citizen of the United States, and a resident of the city of Philadelphia, in the State of Pennsylvania, have invented certain new and useful Improvements in Shears, of which the following is a full, clear, and exact description, reference being had to the accompanying drawings, forming a part of this specification.

My invention relates to shears, and has for its object improved mechanical means of pivotally connecting the blades so that they will not bind upon each other at the point nor grind the edges of the blades when in use.

Figure 1:
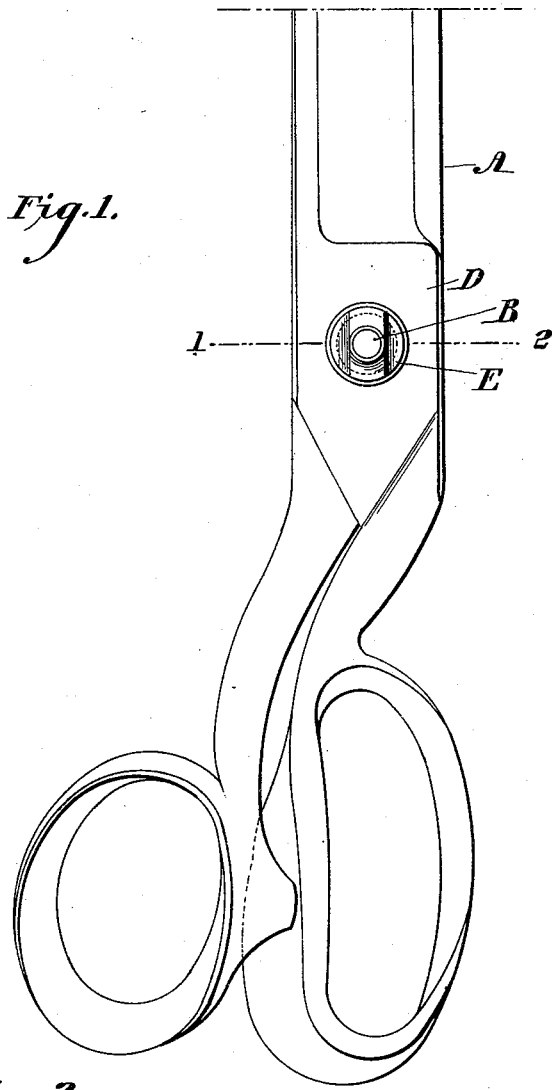
Figure 2:
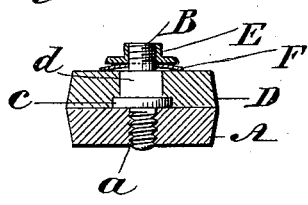
Figure 4:
Figure 3:
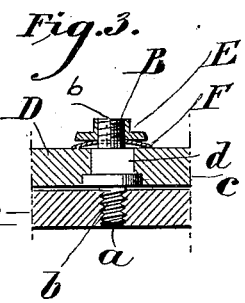

In the accompanying drawings, illustrating my invention, Figure 1 is an elevation of a pair of shears, the blades of which are pivotally connected according to my invention. Fig. 2 is a vertical section through the line 1 2 of Fig. 1. Fig. 3 is a like view showing the relative position of the blades facially when the shears are opened and the blades spread apart; Fig. 4, a lower end view of the connecting-pin.

Heretofore shears have been constructed with a spring between the outer face of the top blade and the retaining-nut in the connecting-pin; but this did not prevent the difficulty my invention is intended to overcome—viz., of preventing the blades from binding at the point of pivotal connection and also of the ends of the blades meeting and the edges thereof grinding against each other.

My invention accomplishes these objects perfectly; and it consists of the combination, with a pair of shear-blades, of a connecting-pin one end of which is screw-threaded and works free in a screw-threaded recess in one shear-blade, said pin having on it a retaining-collar and nut adapted to fit a like-shaped recess in the under face of and passing through the upper blade and preventing rotation therein, and another screw-threaded end or other equivalent means to retain a locking nut thereon, and a spring encircling the pin between said locking-nut and the outer face of the blade. The under blade A is shown screw-threaded at $a$, into which fits the lower screw-threaded end $b$ of the connecting-pin B, which is provided midway of its length with a bearing $d$, of square, polygonal, or other equivalent shape, to prevent rotation, and preferably an annular collar $c$ in addition thereto, both resting in a similarly-shaped recess in the upper blade D of the shears. The upper end $b'$ of the connecting-pin B is also screw-threaded or provided with other equivalent means to be retained by the locking-nut E. Beneath the latter and between it and the outer face of the upper blade is fitted a spring F, bearing outwardly between the two. The nut E retains the spring in place on the upper blade D and the latter in place on the square bearing of the connecting-pin B.

The operation is as follows, viz: When the shears are opened—that is, when their blades are spread apart pivotally—the lower screw-threaded end $b$ of the connecting-pin rises in the screw-threaded recess in the under blade A, thus raising up the upper blade and separating the pivotal faces of the two blades from contact with each other. When the points of the blades are on the contrary movement brought together in closing the shears, the end $b$ of the connecting-pin descends in the screw-threaded recess in the under blade and brings the blades closer together facially, which movement is aided by action of the spring F, which draws up the polygonal or square bearing $d$ of the connecting-pin into the polygonal recess therefor in the upper blade, and thus the faces of the blades are brought closer together by a gradual movement, so that the blades are not facially brought tightly together until and as their points meet and the shears are fully closed.

Having thus described my invention, what I claim as new, and desire to secure by Letters Patent, is—

1. In shears, means for pivotally connecting the blades and operating to facially separate the blades when opening the shears and to draw them facially toward each other when closing the same, consisting of a connecting-pin with a screw-threaded end adapted to fit and be rotated in a screw-threaded recess in one of the blades, a bearing on the pin for preventing rotation of the same in the opposite blade, and a spring bearing on the outer face of the latter blade and beneath the locking-nut, substantially as described.

2. In shears, the combination, with the blades, one of them having a screw-threaded recess and the other a polygonal-shaped recess opposite each other, of a connecting-pin screw-threaded at each end and provided intermediately with a polygonal-shaped bearing adapted to fit said polygonal-shaped recess in the upper blade, with a spring encircling the connecting-pin and having a bearing between the outer face of the upper blade and the locking-nut on said pin, substantially as described.

In testimony whereof I have hereunto affixed my signature this 27th day of April, A. D. 1892.

HERMAN HERDER.

Witnesses:
H. T. FENTON,
JOHN R. NOLAN.